Oct. 4, 1960   F. V. F. PAUL   2,955,065
METHOD OF REPAIRING A WIRE-REINFORCED CONVEYER BELT
Filed April 28, 1958
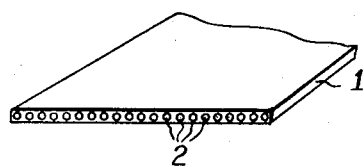
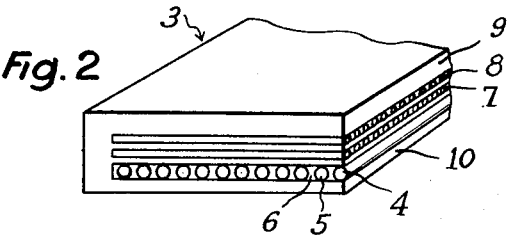
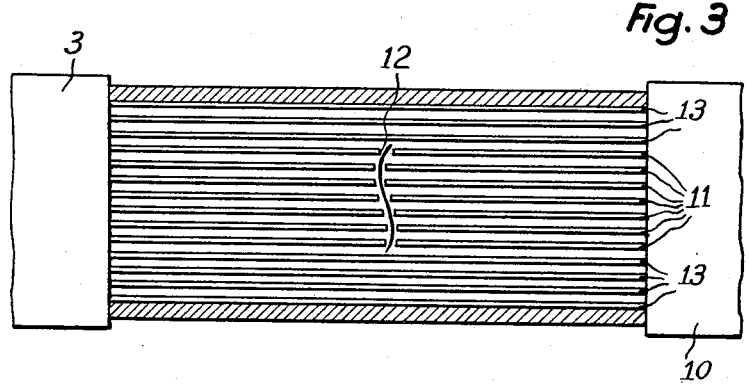
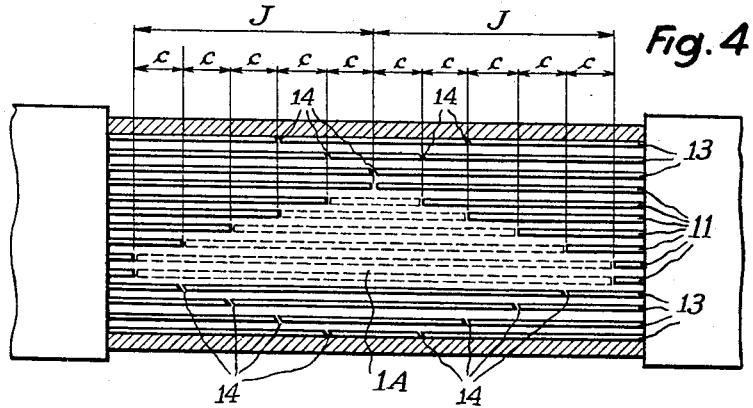

United States Patent Office 2,955,065
Patented Oct. 4, 1960

2,955,065

METHOD OF REPAIRING A WIRE-REINFORCED CONVEYER BELT

Francis Victor Frederic Paul, Paris, France, assignor to Société anonyme dite: Pneumatiques & Caoutchouc Manufacture Kleber Colombes, Colombes, France Filed Apr. 28, 1958, Ser. No. 731,490

Claims priority, application France Apr. 29, 1957

1 Claim. (Cl. 154—104)

This invention relates to conveyer belts of the general type including rubber and steel reinforcement wires or cables. The term "rubber" is used herein to designate both the natural product and its synthetic equivalents for the purpose contemplated. More specifically the invention is directed to improved methods and means for repairing such belts in case of breakage of the reinforcement therein.

When some of the longitudinal reinforcing wires in such a conveyer belt have failed the relative drop in tensile strength resulting in the belt is greater than would be indicated in terms of the percentage of reinforcing wires that have failed. It is, therefore, necessary that the means of repair used should restore the original tensile strength. A method sometimes used is to insert a sufficient number of additional wires between the broken wires; this method however is very frequently inapplicable in connection with the type of belt here contemplated owing to the close transverse spacing between the wires.

Another conventional method of repair is to bond a strong patch of reinforced material over the break. This introduces an objectionable added thickness as well as excessive stiffness in the repaired area.

Moreover, in the transverse section including the patch the elastic modulus is lower than adjacent the unbroken wires, so that the load distribution is non uniform and the sections adjacent the repair are subjected to excess load.

It is an object of this invention to eliminate the above and other related drawbacks of conventional conveyer belt repairing processes and to provide a simple method whereby a broken reinforced conveyer belt can be restored practically to its original service condition.

Another object is to effect the repair in such manner that the tensile strength in the repaired section will not be less than in the section including the connection between the opposite ends of the endless belt. An object is to insure a uniform longitudinal modulus of elasticity throughout the width of the belt in the area of repair. Objects also are to provide such a method of repair which will require a minimum amount of time and labor and added material, and which will not foreshorten the belt.

In accordance with a principal aspect of the invention the means used for repairing a conveyer belt of the type described comprises a repair strip comprising steel ropes or wires similar to the longitudinal composition reinforcing wires or ropes in the belt to be repaired, imbedded in rubber composition and vulcanized.

In such a repair sheet the wires are in a protected condition and hence can be stored for long periods of time without oxidation until such time as a piece of the repair strip may have to be cut out and used to repair a damaged belt. Another advantage is that the bonding of a piece cut out from such a strip to a damaged conveyer belt will only involve vulcanization bonds between adjacent rubber surfaces, rather than between metal surfaces or metal to rubber bonds. In this connection, it will be recalled that satisfactory adhesion in a steel to rubber bond is difficult to obtain. Satisfactory steel to rubber bonds are obtained in the manufacture of the conveyer belt and of the repair strip according to the invention by methods that are known in the art and are easily applicable in the manufacturing plant, but the user of the repair strip will not have to take care of this troublesome problem but will simply be faced by the much simpler problem of bonding rubber surfaces together by vulcanization.

An exemplary embodiment of the invention will now be described by way of illustration but not of limitation with reference to the accompanying diagrammatic drawings, wherein:

Fig. 1 is a fragmentary perspective showing of a repair strip according to the invention;

Fig. 2 is a fragmentary perspective showing of a conveyor belt of the kind to which the invention relates;

Fig. 3 is a plan view of a damaged conveyer belt of the type shown in Fig. 2, as seen from its under side and with its under facing ply removed;

Fig. 4 shows the same portion of damaged belt with explanatory indications relating to the process of repair according to this invention.

Referring first to Fig. 2, a widely used type of reinforced rubber conveyer belt comprises an under facing or backing ply 10, an array of closely spaced parallel longitudinal reinforcing wires or steel ropes 5 thereover, imbedded in a rubber composition 6, a ply 7 of transverse textile strands or the like similarly imbedded in a rubber composition and thereover an array of transverse reinforcing steel ropes or wires 8 imbedded in rubber composition, the wires 8 being generally smaller and weaker than the longitudinal wires 5; overlying the transverse reinforcement is an upper or carrier facing 9.

Fig. 3 shows the same belt in damaged condition with the backing ply 10 removed and showing that some of the longitudinal wires 5 have broken along a roughly transverse line 12. The broken wires are designated 11 and the undamaged wires 13.

In repairing the belt according to the method of the invention, a repair strip is used as illustrated in Fig. 1; the strip comprises an array of longitudinal steel ropes or wires 2 similar to the steel ropes or wires 5 in the belt, and embedded in a similar rubber composition. Such a strip can be produced by conventional means including rolling and vulcanizing in a press between elastic, non-sticking backing surfaces.

In using this repair strip to repair the damaged belt shown in Fig. 3, the under facing 10 is removed from the belt around the damaged area over a total length substantially such as indicated by J at either side from the break, as indicated in Fig. 4. The length J is predetermined in a manner to be made clearly apparent hereinafter. The damaged wires 11 are then cut in accordance with the pattern indicated in Fig. 4 at either side of the break 12, and are pulled away from the rubber composition in which they are imbedded. The cuts are effected at points symmetrical to either side of the break 12, and displaced by constant incremental distances from each broken wire to the next, said equal increments being indicated by $c$ in Fig. 4. The value $c$ is so predetermined that the intervening amount of rubber between the displaced ends at every pair of adjacent wires will be sufficiently great, when stressed in shear, to transmit the tensile force without the shear yield point of said rubber being exceeded. In other words, the spacing $c$ is long enough to insure that the intervening body of rubber having the length $c$ between two wires is able to withstand a shear load not lower than the tensile loading of a wire. It will be apparent that under such conditions, the force-transmitting bond between adjacent ones of the broken wires 11 on each side of the break 12 will be unimpaired.

The length J is selected as an integral multiple of the length c predetermined as just described. While in the drawing the incremental steps c between the cuts are shown as all being taken in the same sense, i.e. away from the cut 12 when proceeding from the uppermost (as shown) broken wire 11 across the belt, this is not absolutely essential. The steps may be taken first in one direction (e.g. outwardly from the cut 12) then in the other direction (inwardly towards the cut) provided such reversals do not alternate too closely but are separated by an adequate number of intervening wires. Further, every time such a reversal is made two adjacent wires are preferably cut in the same transverse plane so as to provide of uniform distribution of tensions.

After the lengths of broken wires 11 have been cut and removed as just described, leaving the blank spaces indicated by the dotted lines in Fig. 4, a piece is cut out of the repair strip 1 which corresponds in configuration to the pattern defined by the outer contour of the cuts. Thus the cut-out piece includes the same number of wires 2 as there were broken wires 11 in the belt, and has the total length 2J. This piece is inserted into the space 1A left by the cut wires in the belt, and is bonded to the belt by dissolution of the rubber composition and/or vulcanization.

In order to provide a uniform elasticity modulus in the repaired area across the width of the belt, according to a feature of the invention, the unbroken wires 13 are each cut at points as indicated at 14 in Fig. 4 which are longitudinally displaced from one another by the same step spacing c as previously defined. These wires of course, are not removed from the belt but are allowed to remain in position bonded to the rubber ply. The resulting pattern is that of a double symmetrical junction similar to what is conventionally used in joining the opposite ends in forming an endless belt. As a final step, the under facing 10 is applied over the repaired area and bonded by dissolution and vulcanization.

A belt repaired in the manner described has a tensile strength in the repaired area which is not lower than that in the joined area as will be evident from the above description of the manner in which the damaged wires were cut. Thus this method of repair insures a minimum of loss in strength of a damaged belt: further the load distribution across the width of the repaired belt in the repaired area is substantially uniform for the reasons described. In the ensuing claim, the word "wire" is used to designate metallic wire, cable and rope; the word "rubber" designates both natural and synthetic elastomers.

What I claim is:

The method of repairing a conveyer belt having a ply of rubber composition with longitudinal reinforcement wires embedded therein and wherein some of said wires have been damaged, comprising the steps of removing the under facing of the belt around the damaged area, cutting each of the damaged wires at two points spaced from the damaged area on both longitudinally spaced sides of said area, each cut in each damaged wire being spaced from the corresponding cut in an adjacent wire by a fixed distance in the longitudinal direction of the belt, removing the portion of each damaged wire between said cuts, whereby a reinforcement-free area is formed in the belt, inserting into said area a correspondingly cut-out piece of a repair strip comprising a rubber composition with wires embedded therein corresponding in gauge and spacing to said reinforcement wires, whereby said removed portions of said damaged wires are replaced by corresponding lengths of undamaged wires, bonding the rubber composition of said strip to the rubber composition of said belt, cutting undamaged wires in said belt at two longitudinally spaced-apart points each longitudinally spaced by said fixed distance from corresponding cuts in adjacent wires, and applying an under facing over the repaired area.

References Cited in the file of this patent

UNITED STATES PATENTS

| | | |
|---|---|---|
| 1,409,601 | Spink | Mar. 14, 1922 |
| 1,735,686 | Kimmich | Nov. 12, 1929 |
| 1,903,406 | Putvin | Apr. 4, 1933 |
| 2,566,262 | Traxler | Aug. 28, 1951 |
| 2,852,058 | Chambers et al. | Sept. 16, 1958 |